ced Patent [19] 3,984,349
Meiller et al. [45] Oct. 5, 1976

[54] MODIFIED POROUS BODIES
[75] Inventors: Francois Meiller, Palaiseau; Claude Bonnebat; Michel Deleuil, both of Antony, all of France
[73] Assignee: Societe Rhone-Progil, France
[22] Filed: Aug. 22, 1974
[21] Appl. No.: 499,612

Related U.S. Application Data
[63] Continuation of Ser. No. 272,131, July 17, 1972, abandoned.

[30] Foreign Application Priority Data
July 26, 1971  France .............................. 71.27215

[52] U.S. Cl. ................................ 252/428; 252/426; 210/31 C
[51] Int. Cl.$^2$ ......................................... B01D 15/08
[58] Field of Search ..................... 252/428, 430, 426

[56] References Cited
UNITED STATES PATENTS
3,722,181   3/1973   Kirkland et al. ................. 252/428 X
3,839,385   10/1974  Meiller et al. .................... 252/430 X

*Primary Examiner*—Patrick P. Garvin

[57] ABSTRACT

Bodies formed of porous, divided or colloidal inorganic material containing surface hydroxyl groups which are modified by grafting to the surface an organic group to establish an —O—Si bond, wherein the organic group has an average molecular weight greater than 150 and contains at least one hydrophilic functional group. The bodies of this invention are well suited for use in chromatography.

5 Claims, No Drawings

MODIFIED POROUS BODIES

This is a continuation of application Ser. No. 272,131, filed July 17, 1972, now abandoned.

The invention relates to the modification of the surface properties of porous or divided bodies, by grafting organic groups of atoms thereto through a silcon atom, wherein the organic groups have properties of a hydrophilic character, primarily for imparting to the bodies particular chromatographic properties.

The extremely wide range of uses of the surface properties of many natural or synthetic porous or divided bodies is known. Such bodies include, for example, clays, diatomaceous earth, zeolites, active carbon and various oxides. The colloidal state of many of these bodies is favorable to the manifestation of such surface properties; all these bodies owe their properties to the development of their surface, which is related to the porosity characteristics in the case of porous bodies, or to the elementary dimensions of small particles when the bodies are in a highly divided form, including colloidal form.

Among these various bodies, industry is tending more and more to turn to synthetic compounds, to which it is possible to impart well defined and reproduceable properties. Among such compounds, the choice falls on a fairly restricted class comprising some oxides and hydroxides and mixtures thereof, the most important of them being those of silicon, aluminium and magnesium.

Among the uses of the surface properties of various bodies, chromatography in its various aspects is one of the most interesting, not because of the quantities of substances treated but because of the high degree of selectivity which can be achieved in separation operations and, in return, because of the wide variety of surface properties of the various compounds which such separation operations can bring into play. A long time ago, for example, a practical device for chromatographic separation was perfected, which comprises passing a fluid containing the substance or substances to be separated, through tubes whose length is great in relation to their diameter, with the tubes being filled with various porous bodies. Among these porous bodies, siliceous bodies are frequently used because of the various surface and porosity characteristics which can be imparted thereto.

However, when used for carrying out certain separation operations by means of chromatographic methods, siliceous porous bodies do not give the expected results. The reasons for this phenomenon are probably due to the high degree of reactivity of their residual functions and the particular adsorbent properties of the siliceous porous bodies.

In order to overcome these disadvantages, it has been proposed to modify the surface properties of siliceous bodies by impregnation with various organic chemical compounds, called stationary phases, in a monomolecular or plurimolecular layer. This method suffers from many disadvantages, due to the low degree of affinity of the stationary phases for silica, which means that the fillings for chromatographic columns lack stability, due, for example, to the volatility of the stationary phases or their solubility in the eluants used.

Moreover, it is well known that it is generally possible to react the hydroxyls present on the surface of various defined solid chemical compounds, or even on the surface of any bodies, and in particular the hydroxyls which are present on the surface of siliceous bodies, with many chemical compounds of carbon and silicon, which are capable of removing the hydrogen atoms from the hydroxyls and becoming fixed to the surface of the bodies, by means of bonds which are formed between the oxygen atoms of the hydroxyls and the silicon or carbon atoms of the chemical compounds. Such groups of atoms and radicals can be complex.

It has been recommended that this mode of operation be used to fix various groups of atoms acting as stationary phases, in particular on the porous bodies obtained from silica gels or from glasses, which can be provided with micro-porosity by means of particular treatments, thus improving the properties of such bodies for chromatographic uses. In particular, such grafting of groups of atoms by means of silicon atoms of various organic silanes is more attractive as being substantially irreversible, due to good resistance of the products to heat and hydrolysis.

However, the separation of particularly fragile molecules, often of biological origin, such as proteins and enzymes, is frequently poor, even on siliceous bodies on which groups of atoms have been grafted by means of the various silanes mentioned above.

It is accordingly an object of the present invention to provide porous or divided bodies which overcome the foregoing disadvantages, and it is a more specific object of this invention to provide porous or divided bodies to which hydrophylic organic groups have been grafted for use in chromatographic separations.

It has been found in accordance with the present invention that porous or divided bodies for use in chromatographic separation of polar molecules and particularly molecules such as those of enzymes and proteins can be prepared by grafting onto such bodies, through the —O—Si— bond, organic groups having an average molecular weight of more than 150 and preferably within the range of 200 to 4000 and having at least one functional group which imparts to the organic groups hydrophilic characteristics. Such functional groups are of themselves well known and included ether, alcohol (hydroxy) and pyrrolidone functions.

So that grafting of these groups can be effected, it is desirable to start from a silicon-containing chemical compound comprising, in addition to the organic groups described above, a silicon atom, and, linked to the silicon atom, at least one radical or atom capable of reacting with a residual hydroxyl of the porous or divided bodies, by removing the hydrogen from said hydroxyl.

For grafting a suitable number of groups, it is desirable that the porous or divided bodies should have a sufficient density of hydroxyls. In most cases the density of hydroxyls is higher than 0.5 hydroxyl per 100 of the surface area, and preferably from 1.5 to 4 per 100 $A^2$.

Among porous bodies which are capable of being treated in accordance with this invention mention can be made, as being particularly suitable, of silica gel bodies in which the development of porosity is effected thermally, in the presence of foreign atoms such as alkali metals and certain atoms capable of giving acid functions, or hydrothermally in the presence of ammonia. Such methods are described in French Pats. Nos. 1,473,240, 1,482,867 and 1,528,785, and also in co-pending U.S. application Ser. No. 147,241 filed on May 20, 1971 now abandoned, and U.S. application Ser. No. 20,850, filed Mar. 18, 1970 now U.S. Pat. No. 3,696,053, and provide bodies of widely varying porous characteristics and shape, the distribution of the pore dimensions being within a more or less restricted range according to the treatments to which the initial gel is subjected.

Silicon-bearing chemical compounds capable of being used for achieving the desired grafting on porous or divided bodies can have widely varying formulae, and can be produced by using known methods, such as the addition of a compound comprising a vinyl or allyl termination and at least one hydrophilic radical and a simple silane, or by co-polymerisation of a vinyl monomer containing at least one hydrophilic radical and an unsaturated silane, that is, an organo silane in which the organic group contains ethylenic unsaturation.

The grafting of suitable groups on the porous or divided bodies, by using silicon-containing compounds, must be effected while avoiding other reactions of hydrolysis of the silicon-containing compounds. Such reactions can occur with the water simply adsorbed by the porous or divided bodies; therefore the bodies to be treated should be carefully dried. The grafting of the organic group onto the bodies is effected by contacting the porous or divided bodies with the organo silicon compound which can be in the liquid or vapor phase. If desired, the organo silicon compound can be dissolvent in an inert solvent for contact with the porous or divided bodies. After the bodies are contacted with the organo silicon, the bodies are preferably washed with an inert solvent, dried and then subjected to a heat extraction step in the presence of one of such solvents over a period of up to a few hours for the purpose of removing any fraction of the organo silicon compound which has simply been absorbed and not chemically bonded or grafted through the oxygen atoms of the hydroxyl groups.

The porous or divided bodies, modified by the grafting of groups, in accordance with the present invention, are found to have, in addition to their hydrophilic properties and their resistance to heat and hydrolysis, a good degree of resistance to the action of many organic solvents such as acetone or toluene. Thus, the modified bodies enjoy a group of properties which permit them to be used in many different chromatographic processes such as exclusion chromatography, which can be used for separating biopolymers and water-soluble polymers, separation by division in liquid or gaseous chromatography and separation by adsorption in liquid or gaseous chromatography, the liquid media being aqueous or organic.

The following examples show the good results obtained with silica gel bodies whose surface properties are modified in accordance with the present invention, because the silica gel is particularly suitable for the production of highly porous substances, with varying ranges of porosity; examples are also given by way of comparison, to show the unsatisfactory degrees of separation achieved by graftings which do not comply with the characteristics set out hereinbefore. It will be understood that the examples which illustrate the practice of this invention are provided by way of illustration, and not by way of limitation.

EXAMPLE 1

This example concerns exclusion chromatography.

The porous bodies subjected to the grafting operation are silica gel microballs having the following characteristics:

diameter: 100 to 200 $\mu$
specific surface area: 130 sq.m/g
pole volume: 0.8 ml/g
mean pore diameter: 225 A
number of hydroxyls: 2 per 100 A².

(the last characteristic is determined by calculation from measurement of the increase in weight, produced by reaction on hexamethyldisilazane of a specimen of the dried microballs, the grafting effected in this way involving virtually all the hydroxyls present). 80g of the silica gel microballs, after preliminary drying at a temperature of 150°C for a period of 3 hours under a pressure of 0.1 mm mercury, are brought into contact with a solution of a volume of 400 cm³ composed of toluene and 40g of a silane prepared by the addition of dimethylchlorosilane, of a condensation compound of ethylene oxide having a vinyl termination, of the formula:

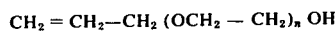

in which $n$ has a value of from 8 to 10 (silane A).

The microballs treated in this way are then washed with toluene, dried with a pump, and then for 1 hour in a drying oven at 110°C.

The amount of carbon contributed by the groups which are grafted in this way is 5.4% by weight of the treated microballs, which corresponds approximately to saturation of 80% of the hydroxyls present. Thermogravimetric analysis of the treated microballs, effected under nitrogen with a linear programming for a rise in temperature of 200°C/hour, shows a loss in weight by heat decomposition only from 280°C, which shows the heat stability of the grafting.

The treated microballs are used to fill a glass column with a diameter of 2.5 cm and a length of 20 cm, which is eluted at a rate of 200 ml/hour with a buffer solution having a pH-value of 7.5. The chromatographic assembly used comprises an injection valve, an ultraviolet detector operating at a wave-length of 276 millimicrons, provided with a logarithmic registering device, which permits quantitative evaluation of the eluted substances, and a cell having a constant volume of 8 ccm, for measuring the elution volume of the injected constituents.

Into the column is injected a 1% solution in water of the equal-weight mixture of phthalic acid and blue dextran, which has a molecular weight of about 2.10⁶ and is currently used as a standard for chromatography in aqueous medium. The difference in the elution volumes of the two compounds is 32 ccm, which permits evaluation at 0.75 ml/g of the chromatographic pore volume of the filling in the column, which volume is substantially the same as that of the initial microballs; this demonstrates the hydrophilic character of the filling formed by treated microballs.

Once tested in the above manner, the colume is used to treat various solutions of varied enzymes and proteins, each sort of molecule being in a 0.5% by weight solution in the same buffer as that used to elute the column; the above mentioned proteins and enzymes are currently used as chromatography standards.

For each of the chromatograms produced, measurements are taken of the elution volumes evaluated in multiples of 8 ccm, and the areas of the peaks which make it possible to calculate the proportion in % of each of the molecules in question, which are recovered in the elution step, and the proportions in % of any impurities which may be present.

By way of comparison, the same tests are carried out on the same column, but the filling of the column comprises the same amount of microballs which have not been treated.

The results obtained are shown in the following table:

TABLE

| Molecules subjected to the tests (proteins or enzymes) and approximate molecular weight | Treated microballs | | Untreated microballs |
|---|---|---|---|
| | Amount of eluted molecules or eluted impurities in % of the injected amount | Elution volume of the peak in multiples of 8 ccm | Amount of eluted molecules in % of the injected amount |
| cytochrome C (contains 0.43 % Fe) 13,000 | >90 | 8 | 0 |
| horse myoglobin 18,000 | >90 <5(impurity) | 6.7 4 | 0 |
| bovine hemoglobin 64,000 | >95 <1(impurity) | 6 4 | 0 |
| albumin of human serum 67,000 | >95 *2(impurity) | 5 8 | *50 |
| γ globulin of human serum 160,000 | >90 | 4.4 | *10 |
| fibrinogen of a bovine serum 330,000 | >90 *5(impurity) | 4 8 | *50 |
| thyroglobulin of a bovine serum 600,000 | >90 <5(impurity) | 4 8 | *10 |

*denotes an aproximate value.

This table shows, by comparing the elution volumes obtained for the series of molecules, that classification follows the increase in molecular weight, and that the elutions are virtually total when the tests are carried out on treated microballs, whereas the untreated microballs act as adsorbants which permit only poor elution or no elution at all.

An aging test over 4 weeks, by elution, at 50 ml/h at from 25 to 30°C, of the column containing the treated microballs, did not cause a reduction in the results obtained, which shows the stability of the grafted groups of atoms.

EXAMPLE 2

This example is intended to show by comparison with the results obtained with the treated microballs of the preceding example, the necessity that the groups of atoms arising from the silane should be of sufficient weight.

In the present case, the silane permitting grafting of groups of atoms has the following formula:

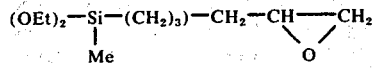

and is plainly of low molecular weight (silane B).

In the same general manner as in the preceding example, the same microballs are treated by a solution in toluene of the silane B; the grafting effect is verified by carbon quantitative determination, the amount of carbon attaining 1.8 % by weight of the treated microballs, which, taking into account the amounts of carbon present in the two groups of atoms resulting from the silanes A and B, corresponds to a higher degree of efficiency of the grafting reaction. The treated microballs are used in the same manner as in the preceding example, for the chromatography of some of the molecules used in the preceding example. The following table gives the results obtained as regards the proportion of such molecules which occur in the eluted portions.

TABLE

| Molecules subjected to the tests | Amount of molecules eluted in % of the amount injected |
|---|---|
| myoglobin | < 10 |
| albumin | < 10 |
| γ globulin | < 10 |
| fibrinogen | < 10 |
| thyroglobulin | 40 | denotes an aproximate value.

This example shows that silane B, although having hydrophilic functions, like silane A, gives rise to an unfavorable modification of the chromatographic properties, except as regards thyroglobulin whose eluted amount remains much lower than in the case of the elution effected in Example 1 on treated balls.

EXAMPLE 3

This example also concerns exclusion chromatography, by means of microballs treated by another silane having the following formula:

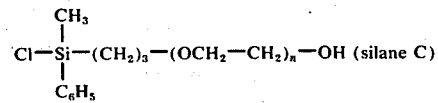

whose molecular weight is of the order of 550 and which has a hydrophilic function.

Grafting is effected on silica gel microballs having the following characteristics:
diameter: 100 to 200 μ
specific surface area: 6 sq.m/g
pore volume: 0.8 ml/g
mean pore volume: 5200 A
number of hydroxyls: 1.9 per 100 A².

The hydrophilic character of the treated microballs is verified in the same manner; the column used is a little different from that used in the preceding examples. By way of comparison, tests are also carried out with the same amount of untreated filling, in the same column.

The results obtained for some of the molecules used in Example 1 are indicated in the following table:

TABLE

| Molecules subjected to the tests | Treated microballs | | Untreated microballs |
|---|---|---|---|
| | Amount of molecules eluted in % of the amount injected | Elution volume of the peak in multiples of 8 ccm | Amount of molecules eluted in % of the amount injected |
| cytochrome C | > 95 | 9 | 0 |
| myoglobin | > 95 | 9 | 0 |
| albumin | > 95 | 9 4.5 (impurity) | < 60 |
| Thyroglobulin | > 95 | 8 4.5 (impurity) | < 60 |

This test shows that the silane C used in this example is suitable for treating carriers having very high mean pore diameters, and permits separation of molecules of high molecular weights.

EXAMPLE 4

This example also concerns exclusion chromatography. The silane used has a molecular weight evalued at 1900, and has the following formula:

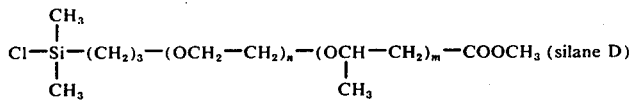

It is produced by the addition to dimethylchlorosilane of a polycondensate of propylene oxide and ethylene oxide, containing approximately 2 molecules of ethylene oxide for one molecule of propylene oxide and end blocked with acetic acid and allyl alcohol. The microballs treated in a similar manner to that described in Example 1 have the following characteristics:
diameter: 100 to 200 $\mu$
specific surface area: 280 sq.m/g
pore volume: 0.85 ml/g
mean pore diameter: 108 A
number of hydroxyls: 2.1 per 100 $A^2$.

The amount of carbon fixed is 6.70% by weight of the treated microballs.

34 g of the microballs are used under the same conditions as those in Example 1; the chromatographic pore volume, determined in the same manner as in Example 1, is 0.4 ml/g, this lower value resulting from the greater bulk of the grafted groups of atoms.

The molecules tested here are bovine hemoglobin and albumin of human serum, which are totally adsorbed on the untreated microballs; on the microballs which have been modified by grafting, these two proteins are eluted quantitatively as from the first injection.

EXAMPLE 5

This example also relates to exclusion chromatography. The silane used has the following general formula:

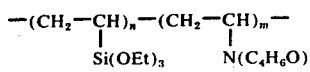

in which the ratio $m/n$ is close to 3. This silane is produced by free-radical co-polymerisation of vinyl triethoxysilane with N-vinylpyrrolidone; it occurs in the form of a viscous oil whose mean molecular weight, as evaluated by measurement by means of a vapor-tension osmometer in benzene at 37°C, is almost 3,500.

Grafting is effected in a general manner similar to that set forth in Example 1 and on the same microballs, at a rate of 7 g of silane per 50 g of the microballs.

After washing and drying, there remains on the microballs 0.55 % by weight of nitrogen and 4.65% of carbon, which shows the reality of the grafting; the hydrophilic character is shown, as in the preceding examples, by means of tests with phthalic acid and blue dextran.

Chromatographic tests are effected under conditions substantially identical to those of Example 1, on various molecules. The results obtained are given in the following table:

TABLE

| Molecule subjected to the tests | Elution volume of the main peak in multiples of 8 cm | Amount of molecules eluted in % of the amount injected |
| --- | --- | --- |
| phthalic acid | 8.4 | 100 |
| cytochrome C | 7.4 | 95 |
| myoglobin | 7.1 | " |
| hemoglobin | 6.6 | " |
| albumin | 5.9 | " |
| globulin | 5.15 | " |
| fibrinogen | 4.8 | " |
| blue dextran | 4.8 | 100 |

A reduction is noted in the pore volume of the carrier due to the already high bulk of the silane. It should be noted that all the molecules tested are eluted totally with the precision close to the measurement, whereas they were almost totally irreversibly adsorbed on the untreated carrier.

EXAMPLE 6

This example relates to the separation of polyvinyl alcohols by exclusion chromatography. Here use is made of the silane A described in Example 1, for treating, in a general manner similar to the preceding examples, silica microballs having the following characteristics:
diameter: 100/125 $\mu$
specific surface area: 60 sq.m/g
pore volume: 0.95 ml/g
mean pore diameter: 480 A
number of hydroxyls: 1.95 per 100 $A^2$.
at a rate of 15 g per 100 g of microballs.

The substance obtained is used for filtering an analytical column having a length of 4 mm and a diameter of 0.8 cm, the column being followed by a differential refractometer detector. In the absence of narrow characterised fractions of polyvinyl alcohols, two commercial polyvinyl alcohols are used, bearing the designations RHODOVIOL 4/20 and RHODOVIOL 60/20, containing the same proportion of free acetate. These two polyvinyl alcohols are injected separately, each injection being of a volume of 0.5 ml and containing 0.5% by weight of alcohol dissolved in water; elution is effected by demineralised and degasified water at a rate of 60 ml/h.

Comparison of the chromatograms obtained clearly shows that the two polyvinyl alcohols are of different mean molecular weights, RHODOVIOL 60/20 being the higher; the latter gives a peak located before the beginning of elution of RHODOVIOL 4/20; the two peaks are devoid of any trail exceeding the total elution volume of the column.

By comparison, the same tests carried out on untreated microballs do not show quantitative elution, the peaks obtained being highly asymmetrical and the trails exceeding the volume of the column.

EXAMPLE 7

This example concerns separation of aromatic compounds by adsorption chromatography in aqueous medium. Silane A as described in Example 1 is used here, to treat in a general manner similar to those described hereinbefore, microballs having the following characteristics:

diameter: 40 to 100 $\mu$
specific surface area: 40 sq/m/g
pore volume: 0.85 ml/g
mean pore diameter: 60 A
number of hydroxyls: 1.9 per 100 $A^2$ at a rate of 16 g of silane per 100 g of microballs.

The length of the column used is 200 cm and its diameter is 1 cm, the detector being an ultra-violet spectrophotometer, the wavelength being adjusted for the best sensitivity according to each aromatic compound.

The aromatic compounds tested are benzylamine, aniline, phenol and pyridine, which are injected separately; elution is effected by a buffer having a pH-value of 7.5.

By way of comparison, the same tests are carried out on untreated microballs.

The following table gives the $\lambda$-wavelengths used for detecting each aromatic product, and the division coefficients K. The coefficients K are determined from the various elution volumes obtained and the interstitial and pore volumes of the column, in accordance with the relationship elution $V$ = interstitial $V + K$ pore $V$.

(The elution volume is defined as the volume of eluent which flows before a peak appears on the chromatogram; interstitial volume is the volume comprised between the microballs, and pore volume is that of the microball pores).

TABLE

| Aromatic compounds | $\lambda$ - detector in $\mu$ | K:microballs treated with Silane A | K:untreated microballs |
| --- | --- | --- | --- |
| Benzylamine | 248 | 2.35 | 1.0 |
| Aniline | 255 | 3.08 | 3.0 |
| Phenol | 276 | 3.38 | 1.8 |
| Pyridine | 280 | 3.55 | 1.0 |

It appears that the division coefficients always increase, which clearly shows the benefit of the treated microballs, for separating aromatic compounds. Moreover, it is found that the elution order is different, which indicates the influence of the grafted groups of atoms. It should be noted that separation of benzylamine from pyridine is not effected on untreated microballs.

EXAMPLE 8

This example concerns separation by exclusion chromatography in a non-aqueous medium, the compounds tested being solutions in acetone titrating 0.5% by weight of fractions of polyethyleneglycol having mean molecular weights of 2020, 1220 and 790, on the same treated microballs as those used in the preceding example. The length of the column used is 1.50 m, while its diameter is 0.8 cm. It is followed by a refractometric detector. The injected volumes are 0.5 ml, elution being effected by acetone at a rate of 50 ml/hour. The elution volumes obtained, together with that given by benzene with a much lower molecular weight, are measured. The results produced are given in the following table:

TABLE

| Compound | Elution volumes in arbitrary units. |
| --- | --- |
| polyethyleneglycol 2020 | 6.1 |
| polyethyleneglycol 1220 | 6.8 |
| polyethyleneglycol 790 | 7.5 |
| benzene | 8.5 |

The elution volumes are arranged correctly in the order of decreasing molecular weights, the test with benzene showing that there is no lag in elution, and therefore no irreversible adsorption.

As an indication, the same microballs which are untreated totally adsorb the same compounds dissolved in acetone. Moreover, prolonged use of the column, over a period of about a month, with the same solvent medium, has not modified the properties thereof.

EXAMPLE 9

This is an example of separation by chromatography in gaseous phase, of a mixture of alcohols.

Silane A as described in Example 1 is used in a similar manner, to treat microballs having the following characteristics:

diameter: 100/200 $\mu$
specific surface area: 100 sq.m/g
pore volume: 1 ccm/g
mean pore diameter: 320 A
number of hydroxyls: 2.1 per 100 $A^2$.

By way of comparison, use is made for the same separation operation, on the one hand of microballs which have been modified by the addition of a commercial stationary phase, which is a polyoxyethylene having a molecular weight of 400, at a rate of 20 g per 100 g of microballs and on the other hand, of untreated microballs. The length of the column used is 200 cm, while its internal diameter is 0.3 cm. It is followed by a detector in the form of a catharometer.

The tests relate to an equal-weight mixture of methanol, ethanol and isopropanol, the carrier gas being nitrogen.

It is found that the untreated microballs permit elution only from 150°C and do not give symmetrical peaks, that the microballs treated by the stationary phase give symmetrical peaks at 55° C but give poor separation of methanol from ethanol, and that microballs treated by silane A give good separation of the three alcohols as from a temperature of 50°C, which shows their superiority.

Supplementary tests as to heat stability of the microballs treated by the stationary phase present a drift as from 105°C, whereas the drift only appears as from 240°C for microballs treated with silane; these figures are confirmed by the curves in respect of the weight losses by heating under nitrogen at a rate of 10°C per minute, of the two samples.

As will be appreciated by those skilled in the art, a number of organo silicon compounds can be used in the practice of the invention in addition to those described. As indicated, the organo silicon should contain at least one organic group attached directly to the silicon atom which has an average molecular weight of more than 150 and preferably an average molecular weight within the range of 200 to 4000 and which has hydrophilic characteristics. Such characteristics are found in organic groups containing ether, hydroxy and/or pyrrolidone functional groups.

In addition, the organo silicon compound should also contain from 1 to 3 readily hydrolyzable groups, such as halogen atoms (e.g., chlorine atoms) or lower alkoxy groups (e.g., methoxy, ethoxy, propoxy) attached to the silicon atom. Such hydrolyzable groups are reactive with the hydroxyl groups of the porous or divided bodies to or from the desired —O—Si— bond between the bodies and the hydrophilic organic group.

As is well known to those skilled in the art, such organo silicon compounds can be prepared by reaction of a silane of the formula

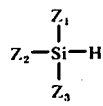

wherein $Z_1$ is selected from the group consisting of halogen and preferably chlorine, or lower alkoxy (e.g., methoxy, ethoxy, propoxy, etc.). and $Z_2$ and $Z_3$ are selected from the group consisting of halogen or alkoxy as described above, or alkyl containing 1 to 5 carbon atoms, aryl and preferably phenyl and substituted derivatives thereof with an organic compound containing terminal ethylenic unsaturation and containing the desired hydrophilic groups. Preferred organic compounds are polyoxyalkylene compounds containing terminal ethylinic unsaturation; such compounds may or may not contain a terminal hydroxy group.

Also contemplated for use in the present invention are the organo silicon compounds prepared by copolymerization of a silane containing 1 to 3 readily hydrolyzable groups as described above and at least one organic group containing a polymerizable ethylenic group (e.g. a vinyl group, an allyl group, etc.) with a monomer containing a hydrophilic group, such as a pyrrolidone group. The organic group contained in the resulting product should have an average molecular weight as specified above.

It will be understood that various changes and modifications can be made in the details of procedure, formulation and use without departing from the spirit of the invention, especially as embodied in the following claims.

We claim:

1. A process for the preparation of treated bodies of silica gel having an organic group grated thereto comprising reacting silica gel with (A) a compound of the formula:

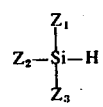

wherein $Z_1$ is selected from the group consisting of halogen and alkoxy, $Z_2$ and $Z_3$ are each selected from the group consisting of halogen, alkoxy, alkyl and aryl groups with (B) an oxyalkylene compound having an average molecular weight greater than 150 selected from the group consisting of (1) a compound of the formula:

$$CH_2 = CH — CH_2(OCH_2CH_2)_nOH$$

and a compound of the formula:

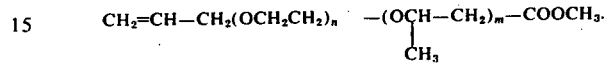

2. Bodies of silica gel prepared by the process of claim 1.

3. A process for the preparation of treated bodies of silica gel having an organic group grafted thereto comprising reacting silica gel with an organo silicon compound prepared by reaction of a compound having the formula:

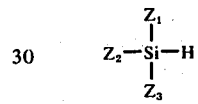

wherein $Z_1$ is selected from the group consisting of halogen and alkoxy, $Z_2$ and $Z_3$ are each selected from the group consisting of halogen, alkoxy, alkyl and aryl groups with an oxyalkylene compound having an average molecular weight greater than 150 selected from the group consisting of (1) a compound of the formula:

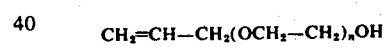

and a compound of the formula

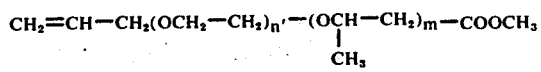

to graft the organic groups from the silicon compound to the surface of the silica gel.

4. Bodies of a treated porous inorganic material prepared by the process of claim 3.

5. A process for the preparation of bodies of silica gel having organic groups grafted thereto comprising reacting with silica gel a copolymer of an organo silane prepared by free radical polymerization of vinyltriethoxy silane and vinyl pyrrolidone in which the organic group bonded to the silicon atom of the copolymer has an average molecular weight of at least 150 to graft the organic groups to the surface of the silica gel.

* * * * *